June 10, 1924.
W. G. ALLAN
1,496,966
ELECTRODE AND METHOD OF MAKING SAME
Filed Sept. 2, 1920
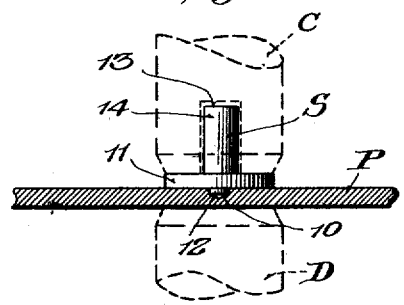
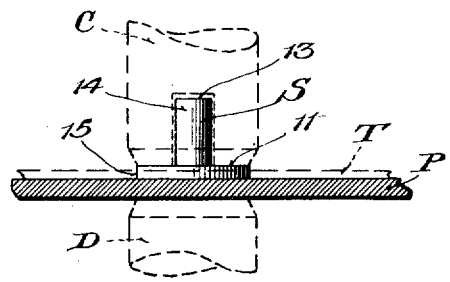
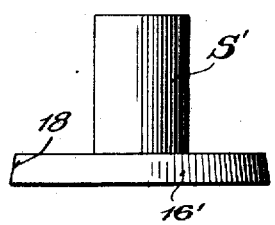
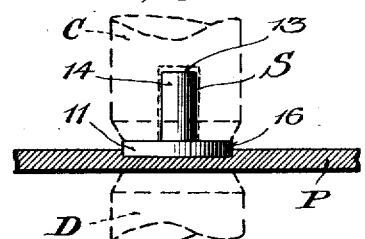
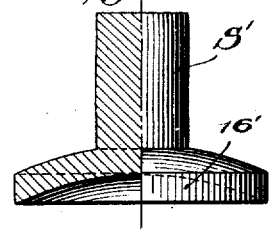
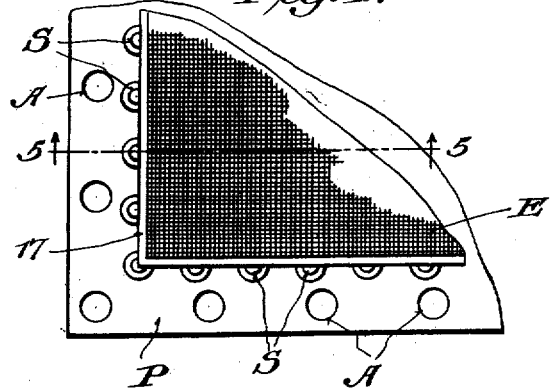
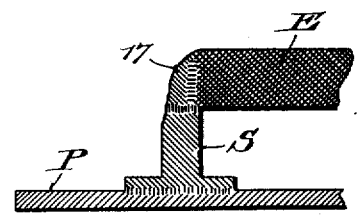
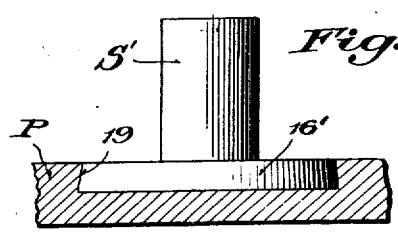
Inventor
William G. Allan,
By
his Attorney Patented June 10, 1924.

1,496,966

UNITED STATES PATENT OFFICE.

WILLIAM G. ALLAN, OF TORONTO, ONTARIO, CANADA, ASSIGNOR, BY MESNE ASSIGNMENTS, TO JOHN P. SCOTT, OF TORONTO, CANADA.

ELECTRODE AND METHOD OF MAKING SAME.

Application filed September 2, 1920. Serial No. 407,638.

*To all whom it may concern:*

Be it known that I, WILLIAM G. ALLAN, a subject of the King of Great Britain, residing at Toronto, county of York, Province of Ontario, Canada, have invented certain new and useful Improvements in Electrodes and Methods of Making Same; and I do hereby declare the following to be a full, clear, and exact description of the invention, such as will enable others skilled in the art to which it appertains to make and use the same.

This invention relates to electrodes and methods of making same; and it has to do particularly with the manufacture of unipolar electrodes for electrolyzers.

In a copending application, Serial No. 355,989, filed February 3, 1920, I have disclosed bipolar and unipolar electrodes of a type comprising a backing plate of suitable material, such as sheet steel, for example, upon which active electrode members are supported by means of stud or pin devices which pass through apertures formed in the backing plate and are anchored to the plate by riveting or otherwise, the joints between the studs and the supporting plate being calked to render them as nearly liquid tight as possible. While this method is entirely satisfactory for bipolar electrodes, where both sides of the cell wall or backing plate are exposed to electrolyte, it is less satisfactory in the case of a unipolar electrode structure serving also as the end wall of a cell exposed to atmosphere. Such an end wall is of course exposed to the electrolyte on its inner side or face only, and it has been found difficult in practice to seal the joints between the supporting studs and the plate so perfectly as to prevent leakage of hot electrolyte through to the outer face of the plate.

Accordingly a principal object of the present invention is to provide an electrode structure which is not subject to the foregoing objection, and in which the supporting studs or pins, instead of passing through the cell wall or supporting plate, are anchored thereto as by welding the studs in place after accurately locating them in proper alinement on the plate to which they are to be anchored. In view of the necessity for accurately positioning the supporting studs on the plate in order to ensure attainment of the requisite degree of accuracy in the finished electrode structure, and also in view of the necessity for welding or otherwise anchoring the studs to the plate rapidly and economically in actual practice, the operation of preliminarily arranging and supporting said studs on the backing plate prior to actual welding forms an important feature of the method of the invention.

Generally described, the novel method of the invention comprises first accurately locating the studs on the plate, in proper alinement and configuration, so that after the studs are welded or otherwise anchored to the plate, the active electrode member or members can be mounted on the tops or outer ends of the studs and secured thereto as by welding. After so arranging and positioning the studs on the plate, and assuming they are to be anchored to the plate by welding, they are welded in place by means of welding jaws, one of which fits over the stud and engages a flange or base provided thereon, while the other jaw engages the opposite face of the plate in axial alinement with the stud. The final step of securing the electrode element to the outer ends of the studs is usually accomplished by welding marginal portions of the active electrode member to the studs, the welding being accomplished electrically or by oxy-acetylene torch means, or otherwise.

The nature of the invention will be more fully understood from the following description, taken in conjunction with the accompanying drawings in which—

Figs. 1, 2 and 3 are sectional views of portions of an electrode supporting plate in process of having stud mounting devices secured thereto by electrical welding, according to different procedures within the present invention;

Fig. 4 is a plan view of a portion of a completed electrode structure;

Fig. 5 is a sectional view of a completed electrode structure, such section being taken on the line 5—5 of Fig. 4; and Figs. 6, 7 and 8 illustrate a method of anchoring the studs to the plate mechanically, still without perforating the plate.

Referring to Fig. 1, the electrode supporting plate P consists in this instance of a thin steel or other suitable metal plate adapted to constitute one of the end walls of a series or battery of cells of the character above mentioned. This plate is imperforate except at its margin where it may be provided with apertures A, punched or otherwise formed to receive through bolts or other devices whereby the plate may be assembled in cooperative relation to other similarly apertured plates of a filter press type of electrolyzer, for example. In this instance, the active electrode member E to be supported on the plate P to form a unipolar electrode is rectangular in form as indicated in Fig. 4; and the supporting studs S, by which it is to be secured to said plate and held in parallel spaced relation thereto, are to be welded to the plate at intervals with their centers on the sides of a rectangle of substantially the same dimensions as the outside dimensions of said electrode member E.

One practical way of carrying out the invention is to lay out on the plate a rectangle of the proper dimensions, and then drill or otherwise form small depressions or recesses 10 at intervals along this rectangle corresponding to the number of studs to be welded to the plate, as shown more or less diagrammatically in Fig. 1. When proceeding in this way, a special form of stud is used in which the base or flanged portion 11 has a small central point or dowel projection 12 that will just fit in the recess or depression 10, which latter extends not more than about half way through the plate P. The studs having been placed in proper position on the plate, each with its dowel projection 12 entering a recess 10, the electrodes C and D on the opposed jaws of an electric welding device may be brought into action as illustrated in Fig. 1. the electrode C having an axial socket or recess 13 adapted to fit over the stem 14 of the stud so that the annular end of the electrode may be forced firmly down against the base 11 of the stud and thus cooperate with the electrode D of the welding machine which engages the opposite face of the plate P. Welding current is then supplied to the electrodes C and D for the necessary period to weld or fuse together abutting portions of the stud base 11 and the plate P. While the stud devices are being thus welded to the supporting plate, the latter may be mounted in a suitable jig or other work holder, not shown.

Instead of employing studs with centering dowels 12, studs having bases with plane lower faces may be used, but in such case it is more convenient to vary the precedure above described. in so far as concerns the accurate centering or alining of the studs in place on the supporting plate. Figure 2 illustrates how this can be done by means of a template T, shown in dotted lines, said template being in the form of a thin plate provided with a plurality of apertures 15 in rectangular alinement and the apertures being of just the proper diameter to receive the bases of the studs. The template is laid on the plate P, and the stud bases are then set in the apertures 15 and welded to the plate by means of the welding electrodes C and D as before described. This procedure has the advantage that it does not require formation of recesses or depressions in the plate P.

According to still another procedure, shallow recesses 16, just large enough to receive the stud bases, may be drilled in the plate P with their centers in proper alinement, and the studs S may then be set in position on the plate with their bases entering said recesses, after which the studs may be welded to the plate as before.

Whichever of the above described procedures is employed, it is to be noted that the studs may be securely anchored to the supporting plate without the neccessity of forming apertures extending through the plate. In this way all trouble from leakage due to imperfectly calked or sealed joints is entirely eliminated, while at the same time good anchorage and electrical contact of the studs with the plate are secured. It is evident also that the operations of placing the studs in the proper arrangement or outline on the plate, and the welding of the studs to the plate, may be accomplished very rapidly, and yet with great precision. The placing and welding of the stud devices may be carried out for each device successively, but it is also possible and more desirable to assemble a plurality of studs in proper alinement on the plate and weld them simultaneously to the plate by means of a welding machine having a plurality of pairs of welding electrodes.

The stud devices. welded to the face of the supporting plate P as described, extend perpendicularly therefrom. their outer ends being all substantially at the same distance from the face of the supporting plate and thus being adapted to support an electrode member in accurately parallel spaced relation to said plate. Such electrode member may be of any suitable construction adapting it for mounting on the ends of said studs. As here illustrated. the electrode member E consists of one or more layers of wire cloth or screen. of which the marginal portions in this instance have been fused to form a rectangular border 17 of the same outside dimensions as the rectangle upon the sides of which the studs S are centered. By means of this border 17. the active electrode member may be placed in position on the outer ends of the studs and secured rigidly thereto by welding at the points where the studs engage the border.

This welding may be effected by means of an oxy-acetylene flame, or electrically, as may be desired. During the welding operation the electrode member may be held in a jig or other suitable work holder so that its outer face is substantially plane and parallel to the plate P. Any slight variations in the length of the studs S, or slight irregularities in the thickness of the border 17 may be readily compensated for by fusing away excess metal or adding metal from a welding rod, during the welding operation, in a manner well understood in the welding art, thereby ensuring accurate plane alinement of the outer face of the electrode member E and accurate parallelism with the plate P.

Figs. 6, 7 and 8 illustrate more or less diagrammatically how the same general object may be attained by a method which involves mechanical anchorage of the studs to the plate instead of welding anchorage. In this embodiment of the invention, each of the studs S' is provided with a base 16' which is coned or tapered, as shown at 18 in Fig. 6, to render the outer face of the base slightly larger than the stem face. The plate P is provided with recesses 19, of which the peripheral walls flare downwardly to correspond to the tapering of said stud bases, so that the entrance to each recess is smaller than the bottom of the recess. The bases of the studs S' are now shaped by suitable die means into the form illustrated in Fig. 7, to make the periphery of the stud base a cylinder coaxial with the stud axis and of a diameter such that it can be inserted into the recess formed in the plate P, after which the stud base is pressed back into normal shape by means of a suitable tool, the final assemblage being shown in Fig. 8. It will be seen that the studs are thus firmly locked to the plate mechanically but without the necessity for drilling holes therethrough. Furthermore, excellent electrical contact of the studs with said plate is obtained, especially if the recesses 19 are formed slightly smaller than the stud bases, so that heavy pressure is required to flatten out the stud bases in the final anchoring step.

What I claim is:

1. The method of making an electrode structure which comprises welding stud devices to a suitable supporting member and securing suitable electrode means to the outer ends of such stud devices.

2. The method of making a unipolar electrode structure which comprises welding stud devices to one face only and within the margin of a suitable supporting plate, and welding an electrode element to the outer ends of such stud devices.

3. The method of making an electrode structure which comprises welding metal stud devices at intervals in a predetermined arrangement to a suitable metal supporting plate, and rigidly securing electrode means to the outer ends of such stud devices.

4. The method of making a unipolar electrode structure which comprises placing metal stud devices having laterally enlarged bases at intervals in a predetermined outline against a face of a suitable substantially plane metal supporting plate, electrically welding such bases to said plate, and uniting suitable electrode means to the outer ends of such stud devices.

5. The method of making an electrode structure which comprises arranging a series of metal stud devices at predetermined intervals upon the face of a suitable rigid and substantially plane metal supporting plate, welding such stud devices to the face of said plate, and welding marginal portions of a suitable electrode member to the outer ends of said stud devices.

6. The method of making a unipolar electrode structure which comprises maintaining a series of metal stud devices seated in predetermined alinement upon the face of a suitable rigid and substantially plane metal supporting plate, electrically welding the bases of such stud devices to the face of said plate, and fusing marginal portions of a suitable electrode member to the outer ends of said stud devices.

7. The method of making a unipolar electrode structure which comprises seating base portions of a series of metal stud devices in recesses in the face of a suitable rigid and substantially plane metal supporting plate, electrically welding such base portions of said stud devices to said plate, and uniting marginal portions of suitable electrode means to the outer ends of said stud devices.

8. The method of making an electrode structure which comprises anchoring supporting and spacing devices to a backing plate without perforating the same, and then mounting electrode means on said devices.

9. The method of making an electrode structure which comprises seating base portions of a series of metal stud devices in recesses in the face of a suitable supporting plate, said recesses being less in depth than the thickness of said plate, anchoring said base portions in said recesses without perforating the plate, and fusing an electrode structure to the free ends of said stud devices.

10. An electrode structure comprising the combination, with a supporting plate, of stud devices secured to said plate by an anchorage involving no perforation of said plate, and electrode means mounted on said stud devices.

11. An electrode structure comprising the combination, with a substantially plane supporting plate, of stud devices weld-united to such supporting plate and projecting substantially perpendicularly therefrom, and an electrode element secured to the outer ends of such devices and spaced thereby from said supporting plate.

12. A unipolar electrode structure comprising a rigid substantially plane supporting plate, an electrode element, and a series of stud devices having enlarged bases welded to a face of said plate, marginal portions of said electrode element being welded to the outer ends of said devices.

13. An electrode structure, comprising, in combination, a substantially plane supporting plate, an electrode element, and a series of stud devices having enlarged bases seated in recesses provided in said plate, said recesses having overhanging walls that lock the stud bases securely to the plate, said bases being otherwise unsecured to said plate.

14. The method of making an electrode structure which comprises forming recesses in a metal supporting plate, said recesses extending only part way through said plate and having overhanging peripheral walls, and inserting into each said recess the base of a supporting stud which base is curved to allow its entry into the corresponding recess, then flattening said base to lock it within said recess, and then securing electrode means to the outer ends of the stud devices.

In testimony whereof I hereunto affix my signature.

WILLIAM G. ALLAN.